F. N. G. KRANICH.
ENSILAGE CUTTER.
APPLICATION FILED MAY 28, 1914.

1,137,334.

Patented Apr. 27, 1915.

WITNESSES.

INVENTOR.
Frank N. G. Kranich
By Morsell, Keeney & French.
ATTORNEYS.

UNITED STATES PATENT OFFICE.

FRANK N. G. KRANICH, OF LAPORTE, INDIANA.

ENSILAGE-CUTTER.

1,137,334.　　Specification of Letters Patent.　　Patented Apr. 27, 1915.

Application filed May 28, 1914. Serial No. 841,440.

*To all whom it may concern:*

Be it known that I, FRANK N. G. KRANICH, a citizen of the United States, and resident of Laporte, in the county of Laporte and State of Indiana, have invented new and useful Improvements in Ensilage-Cutters, of which the following is a description, reference being had to the accompanying drawings, which are a part of this specification.

This invention relates to improvements in ensilage cutters.

Ensilage cutters as ordinarily constructed are provided with knife wheels on which are mounted the fan flights for creating the air blast for elevating the cut material, or the fans are mounted on the same shaft as the knife wheels and rotate therewith at the same rate of speed. In constructions of this kind the air blast could not be increased or diminished without likewise affecting the speed of rotation of the cutter, with the result that if the material was cut too fast for the air blast to elevate the same the trouble could not be overcome by increasing the air blast as the increased blast would likewise increase the cutting speed and thus defeat the object sought to be obtained.

It is one of the objects of the present invention to overcome the before mentioned objectionable feature and to provide an ensilage cutter in which the fan for creating the air blast, while mounted on the same shaft as the cutter, is adapted to be rotated at increased rates of speed without changing the speed of rotation of the cutter mechanism.

A further object of the invention is to provide an ensilage cutter which is simple in construction and operation, and is strong and durable, and in which the speed of the fan may be easily and independently varied as desired.

With the above and other objects in view, the invention consists of the improved ensilage cutter and its parts and combinations, as set forth in the claims, and all equivalents thereof.

Figure 1:
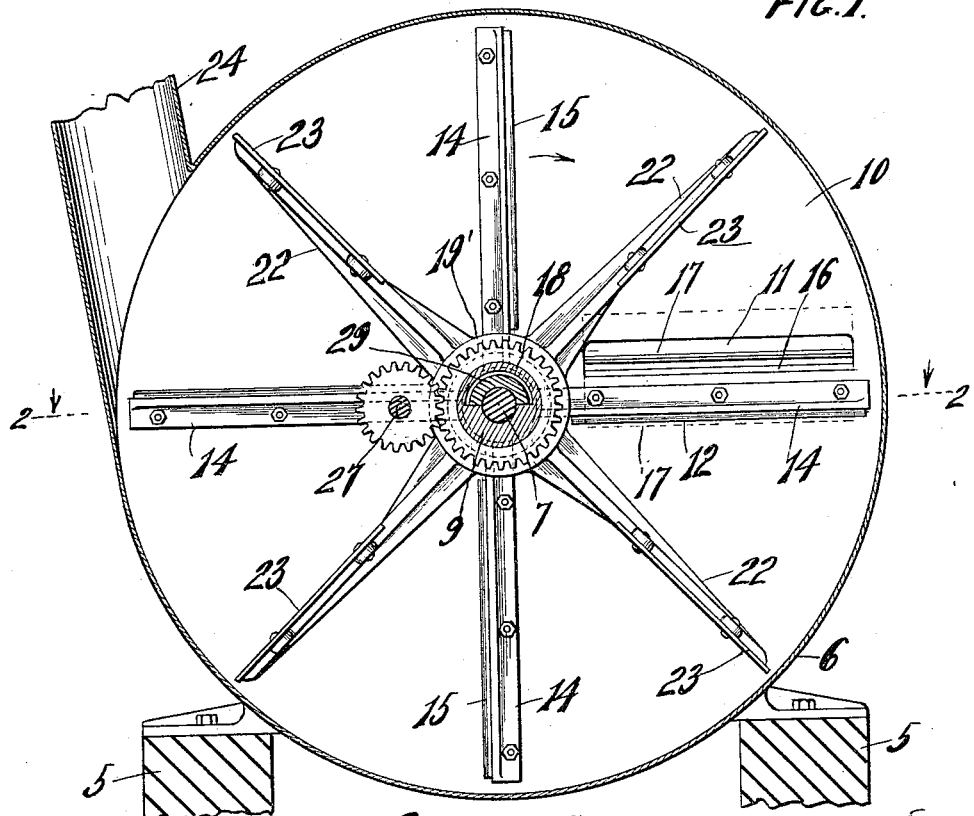
Figure 2:
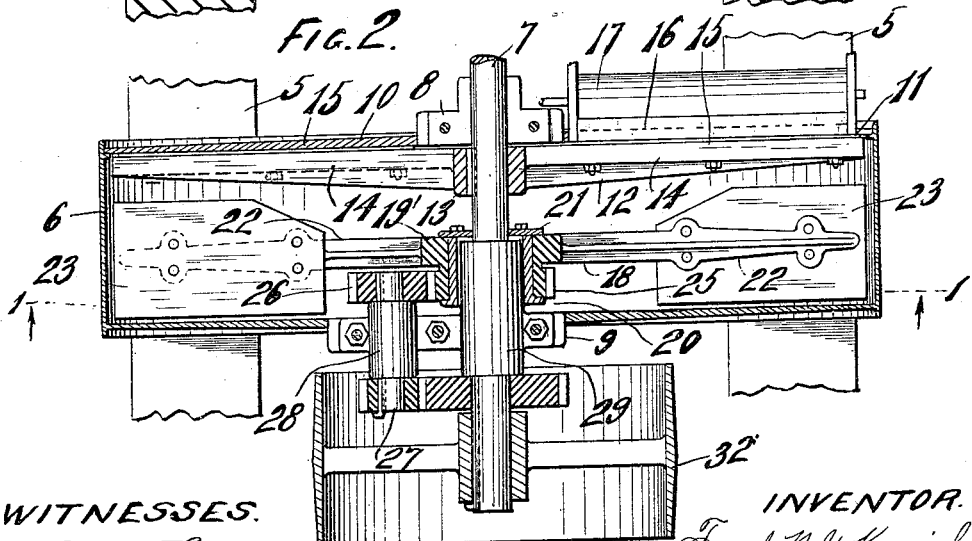

In the accompanying drawing in which the same reference characters indicate the same parts in all of the views: Figure 1 is a vertical sectional view taken on line 1—1 of Fig. 2, of a portion of an ensilage cutter embodying a preferred form of the invention; and Fig. 2 is a horizontal sectional view thereof taken on line 2—2 of Fig. 1.

Referring to the drawing the numeral 5 indicates portions of the cutter frame, 6 the fan casing mounted thereon, and 7 the horizontally extending cutter shaft extending therethrough and journaled in boxes 8 and 9 supported in the casing. The inner wall 10 of the casing is provided with an opening 11 through which the material is fed to the cutter 12 keyed on the cutter shaft 7. The cutter comprises the hub 13 having radial arms 14 extending therefrom, to which the knives 15 are bolted. A complementary knife 16 is fastened to the fan casing at the lower edge of the feed opening 11. Feed rollers 17 or other feed means are positioned just in advance of the fan casing opening and serve to positively feed the material into the casing and above the complementary knife.

The journal box 9 extends into the fan casing approximately one-half the length of the casing and at its inner portion is provided with a semi-tubular bearing 18 upon which the fan 19 is journaled. The bearing 18 is provided with an annular flange 20 and the hub 19' of the fan is positioned between this flange and the removable annular retaining plate 21 which surrounds the shaft and is bolted to the bearing 18 and laps over the inner end of the fan hub. Radial arms 22 extend from the fan hub and at their outer end portions are provided with fan flights 23 which serve to create the necessary air blast to elevate and discharge the cut material through the discharge pipe 24. The outer portion of the hub 19' is slightly reduced in diameter and is in the form of a toothed wheel 25 which is in mesh with a pinion 26 mounted on the inner end of the countershaft 27 which is journaled in a laterally extending portion 28 of the box 9. A cap 29, bolted to the box 9 and its extension 28, and projecting into the semi-tubular bearing 18 of the box, forms the upper portions of the bearings for both shafts.

The outer end portion of the countershaft 27 has a pinion 30 mounted thereon which is in mesh with a gear wheel 31 mounted on the cutter shaft 7. Both the pinion 30 and the gear wheel 31 are removably keyed to their respective shafts in order to provide for substituting other gears therefor of different relative sizes to vary the speed of the fan with relation to the cutter. The cutter shaft is rotated by means of a belt wheel 32 which is mounted on the outer end of the cutter shaft 7.

While the fan and the cutter are shown as inclosed within one casing it is to be understood that the cutter and the fan may be inclosed in separate casings which are in communication with each other without departing from the spirit and scope of the invention.

From the foregoing description it will be seen that the fan is adapted to be rotated at a different rate of speed than the cutter, and that the relative speed values of the cutter and the fan may be varied to any extent desired.

What I claim as my invention is:

1. An ensilage cutter, comprising in part a casing, a shaft extending into the casing and having a cutter mounted thereon, and a fan also within the casing and surrounding said shaft and means for rotating the fan at a different rate of speed than the cutter.

2. An ensilage cutter, comprising in part a casing provided with an inwardly extending journal box, a shaft extending through the box and into the casing and having a cutter mounted thereon, a fan within the casing and journaled on the inwardly extending portion of the box, and means for rotating the fan and the cutter at different rates of speed.

3. An ensilage cutter, comprising in part a casing provided with an inwardly extending journal box, a shaft extending through the box and into the casing and having a cutter mounted thereon, a fan within the casing and journaled on the inwardly extending portion of the box, said fan provided with a gear wheel, a counter shaft extending into the casing and provided with a pinion in mesh with the fan gear, and means for rotating the cutter shaft and the counter shaft at different rates of speed.

4. An ensilage cutter, comprising in part a casing provided with an inwardly extending journal box, a shaft extending through the box and into the casing and having a cutter mounted thereon, a fan within the casing and journaled on the inwardly extending portion of the box, said fan provided with a gear wheel, a countershaft extending into the casing and provided with a pinion in mesh with the fan gear, a gear mounted on the outer end of the countershaft, and a gear on the cutter shaft in mesh with the gear of the countershaft to rotate said shafts at different rates of speed.

5. An ensilage cutter, comprising in part a support, a shaft mounted thereon, a cutter mounted on the shaft, a fan journaled concentrically with relation to the shaft, said fan provided with a gear wheel, a countershaft extending into the casing and provided with a pinion in mesh with the fan gear, means for rotating the cutter shaft and the countershaft at different rates of speed, and unitary inclosing means for the cutter and the fan.

In testimony whereof, I affix my signature, in presence of two witnesses.

FRANK N. G. KRANICH.

Witnesses:
L. L. Dorsey,
Otto A. Dwege.